(12) United States Patent
den Boer et al.

(10) Patent No.: US 8,961,274 B1
(45) Date of Patent: Feb. 24, 2015

(54) SELECTIVE TENDON CUTTER AND METHOD

(71) Applicant: Foodmate B.V., Oud-Beijerland (NL)

(72) Inventors: Mark Thomas Gustaaf den Boer, Oud-Beijerland (NL); Dirk Cornelis Stooker, Puttershoek (NL)

(73) Assignee: Foodmate BV (NL)

( * ) Notice: Subject to any disclaimer, the term of this patent is extended or adjusted under 35 U.S.C. 154(b) by 0 days.

(21) Appl. No.: 14/132,414

(22) Filed: Dec. 18, 2013

(51) Int. Cl.
*A22C 18/00* (2006.01)
*A22C 21/06* (2006.01)

(52) U.S. Cl.
CPC .................................. *A22C 21/066* (2013.01)
USPC ........................................................ 452/148

(58) Field of Classification Search
CPC ................... A47J 43/0711; A47J 2043/04427; A47J 43/0705; A47J 43/0755; A47J 42/04; Y10S 366/601; B01F 13/002; B01F 2215/0026; B01F 7/164
USPC ............. 452/52, 53, 106, 107, 150, 135, 136, 452/149–153, 166, 167, 169, 170, 177, 180
See application file for complete search history.

(56) References Cited

U.S. PATENT DOCUMENTS

| | | |
|---|---|---|
| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,034,440 A | 7/1977 | van Mil |
| 4,118,829 A | 10/1978 | Harben, Jr. |
| 4,131,973 A | 1/1979 | Verbakel |

(Continued)

FOREIGN PATENT DOCUMENTS

| | | |
|---|---|---|
| EP | 0 786 208 A1 | 7/1997 |
| EP | 0 858 739 A2 | 8/1998 |
| EP | 2 181 841 A1 | 5/2010 |

OTHER PUBLICATIONS

EP Office Action dated May 26, 2014 in EP 12 703 612.7-1655.

*Primary Examiner* — Richard Price, Jr.
(74) *Attorney, Agent, or Firm* — Womble Carlyle Sandridge & Rice, LLP (57) ABSTRACT

A method is disclosed for cutting tendons within the drumstick of a poultry leg while leaving the fibula of the drumstick intact. The drumstick has first and second opposing sides where no fibula extends and opposing third and fourth sides along one of which the fibula extends. The method includes suspending the drumstick from its ankle joint, moving the suspended drumstick in a downstream processing direction, cutting the meat and tendons extending along the first side of the drumstick, cutting the meat and tendons extending along the second side of the drumstick, pushing and stretching the meat and tendons of the drumstick to form a bulge projecting in the direction of the third side of the drumstick, cutting through the meat and tendons within the bulge while insuring that the cut is not made completely to the tibia, orienting the suspended drumstick so that its fourth side faces in the direction of a knife blade, pushing and stretching the meat and tendons of the drumstick to form a bulge projecting in the direction of the fourth side of the drumstick, and cutting through the meat and tendons within the bulge while insuring that the cut is not made completely to the tibia. An apparatus for carrying out the method also is disclosed.

23 Claims, 6 Drawing Sheets

(56) References Cited

U.S. PATENT DOCUMENTS

| | | |
|---|---|---|
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |
| 4,488,332 A * | 12/1984 | Atteck et al. .......... 452/136 |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van den Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,723,339 A | 2/1988 | van den Nieuwelaar et al. |
| 4,724,581 A | 2/1988 | van den Nieuwelaar |
| 4,736,492 A | 4/1988 | Hazenbroek |
| RE32,697 E | 6/1988 | Hazenbroek et al. |
| 4,765,028 A | 8/1988 | van den Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van den Nieuwelaar et al. |
| 4,788,749 A | 12/1988 | Hazenbroek et al. |
| 4,811,456 A | 3/1989 | Heuvel |
| 4,811,458 A | 3/1989 | Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek et al. |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | van den Nieuwelaar et al. |
| 4,993,113 A | 2/1991 | Hazenbroek |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van den Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 173,077 | 12/1992 | van den Nieuwelaar et al. |
| 5,173,076 A | 12/1992 | Hazenbroek |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,429,549 A | 7/1995 | Verrijp et al. |
| 5,439,702 A | 8/1995 | French |
| 5,453,045 A | 9/1995 | Hobbel et al. |
| 5,462,477 A | 10/1995 | Ketels |
| 5,470,194 A | 11/1995 | Zegers |
| 5,487,700 A | 1/1996 | Dillard |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |
| 5,713,786 A | 2/1998 | Kikstra |
| 5,713,787 A | 2/1998 | Schoenmakers et al. |
| 5,741,176 A | 4/1998 | Lapp et al. |
| 5,755,617 A | 5/1998 | van Harskamp et al. |
| 5,759,095 A | 6/1998 | De Weerd |
| 5,766,063 A | 6/1998 | Hazenbroek et al. |
| 5,782,685 A | 7/1998 | Hazenbroek et al. |
| 5,785,588 A | 7/1998 | Jacobs et al. |
| 5,803,802 A | 9/1998 | Jansen |
| 5,810,651 A | 9/1998 | De Heer et al. |

(56) References Cited

U.S. PATENT DOCUMENTS

| | | | |
|---|---|---|---|
| 5,810,653 A | 9/1998 | Van Craaikamp et al. |
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,961,383 A * | 10/1999 | Janssen et al. ............... 452/135 |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,599,179 B1 | 7/2003 | Hazenbroek et al. |
| 6,612,919 B2 | 9/2003 | Jansen et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 986,707 A1 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 * | 6/2007 | Annema et al. ............... 452/167 |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van Den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0059333 A1 * | 3/2005 | Annema et al. ............... 452/167 |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0064315 A1 * | 3/2008 | Annema et al. ............... 452/167 |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van De Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

* cited by examiner

SELECTIVE TENDON CUTTER AND METHOD

TECHNICAL FIELD

The present disclosure relates generally to poultry processing and more specifically to automated machinery and methods for selectively severing tendons in a poultry leg prior to stripping meat from the leg bones.

BACKGROUND

Methods of and apparatus for automatically deboning meat and obtaining meat from poultry legs and thighs have been proposed by patent documents U.S. Pat. No. 5,277,649, U.S. Pat. No. 5,401,210, and U.S. Pat. No. 6,699,116. While these automated processes have performed in the past with some degree of success, the mechanical complications and the necessary financial investment have put these processes within reach of only the largest meat processing industries. More recently, improved automated devices and processes for removing meat from an animal extremity such as from the leg of a chicken has been proposed. In this process, a leg comprising a drumstick and thigh is hung from a shackle by its ankle joint and the shackle and leg are moved along a processing path sometimes referred to as a cut-up line. The tendons that extend from the ankle joint are cut just below the ankle joint and the leg proceeds to a meat removal station. At this station, the meat may be grasped by a meat stripper just below the ankle joint where the cut has been made and the stripper is moved away from the shackle and the ankle joint held therein. In this way, the stripper strips the meat from the leg bone or tibia. Meat may then be stripped from the thigh bone or femur, after which the stripped meat is collected for further processing.

In addition to tendons attaching muscle to the ankle joint, a chicken leg also includes a small bone known as the fibula (sometimes called the pin bone or needle bone) that extends along the outside surface of the tibia. For the left leg, the fibula extends along one side of the tibia while for the right leg the fibula extends along the opposite side of the tibia. It is very important that the fibula not end up in the meat that is stripped from the leg and thigh because, if eaten, this small bone can cause damage to the digestive track of a human. Further, much of the fibula is made of cartilage, which is not always detectable by bone detecting devices downstream of a leg deboning machine. Accordingly, when cutting the tendons of the poultry leg below the ankle joint before the meat is stripped, it is critically important that the fibula not be cut in the process. In this way, the fibula remains with the tibia as the meat is stripped away and does not find its way into the stripped meat products that result from the process. In prior leg deboning machines, cutting the tendons while virtually never cutting the fibula or its attaching cartilage has posed problems and has resulted in some cases in undetected pieces of the fibula ending up in the final boneless meat product.

Accordingly, a need exists for a method and apparatus for selectively cutting the tendons of a poultry leg prior to a meat stripping operation while virtually never cutting the fibula in the process of cutting the tendons. It is to the provision of a method and apparatus that addresses this need that the present invention is primarily directed.

SUMMARY

Briefly described, a method is disclosed for cutting tendons within the drumstick of a poultry leg (which is made up of the drumstick and the thigh) while leaving the small fibula bone uncut and connected to the tibia bone of the drumstick. The method will be described herein within the context of a chicken leg, although it may apply to other than just chickens. The drumstick of the leg has a first side facing in the direction of the thigh, a second side opposite the first side, a third side to the left of the thigh and a fourth side to the right of the thigh. The fibula may extend within the drumstick either along the third or left side or along the fourth or right side depending upon whether the chicken leg is a right leg or a left leg. The method is particularly applicable to a modern high speed poultry processing line and includes suspending the chicken leg from a shackle by the ankle joint at the end of the drumstick.

The shackle and chicken leg are moved in a downstream direction along a processing path. For purposes of this disclosure, the direction facing transversely away from the processing path toward worker stations is referred to as the outside of the processing path while the opposite direction facing away from worker stations is referred to as the inside of the processing path. The chicken leg is initially oriented with its first side facing the outside of the processing path and its second side facing the opposite direction toward the inside of the processing path. The meat and tendons extending along the first side and the meat and tendons extending along the second side of the drumstick are then cut just below the ankle joint, preferably with sharp rotary blades disposed on either side of the processing path. These blades may cut to the bone of the drumstick since a fibula bone will never extend along either of these two sides.

The shackle and chicken leg are next reoriented so that the third side of the drumstick faces generally toward the outside of the processing path. The meat and tendons are next engaged on the fourth side (opposite the third side) by an articulating pincher, which progressively pushes and stretches the meat and tendons of the drumstick outwardly away from the third side of the drumstick. However, a fibula extending along the third side of the drumstick is not stretched outwardly by the pincher and remains in position extending closely along the tibia. The pushed out meat and tendons form a bulge on the third side of the drumstick and the bulge is cut just below the ankle joint, preferably again with a rotary blade. However, the blade does not cut completely to the tibia bone during this third cutting step. Accordingly, if there is a fibula bone extending along the third side of the drumstick; it is not cut when the bulge containing meat and tendons are cut by the blade.

The shackle and chicken leg are then reoriented again so that the fourth side of the drumstick faces generally toward the outside of the processing path. The drumstick is again engaged by a pincher on its third side opposite the fourth side, which pushes and stretches the meat and tendons outwardly away from the fourth side of the drumstick. The pushed out meat and tendons form a bulge on the fourth side of the drumstick and the bulge is then cut just below the ankle joint by a rotary blade. Again, the rotary blade does not cut to the bone so that if a fibula is present on this fourth side of the drumstick, it is not cut when the bulge containing meat and tendons are cut.

It will thus be seen that the meat and substantially all of the tendons of the chicken leg are cut around all four sides of the drumstick. Fibula bones, which can extend either along the third or fourth side of the drumstick, are not cut but are left intact adjacent the tibia. As a result, the fibula or pieces of the fibula or its attaching cartilage are not stripped away and do not become embedded in the boneless meat product that results when meat is stripped away from the bones of the chicken leg. Instead, the fibula bones remain attached to the tibia bones. An apparatus for performing the method of the invention also is disclosed and forms a part of the invention. The apparatus comprises various elements that perform each step of the method, as described in more detail below.

Thus, a unique method and apparatus is disclosed for selectively cutting tendons of a chicken leg without cutting the fibula or its attaching cartilage. The fibula therefore does not end up in a boneless meat product that results when the meat is stripped from the bones of the chicken leg. These and other aspects, features, and advantages of the invention will be better understood upon review of the detailed description set forth below taken in conjunction with the accompanying drawing figures, which are briefly described as follows.

DETAILED DESCRIPTION

Figures 1, 3:
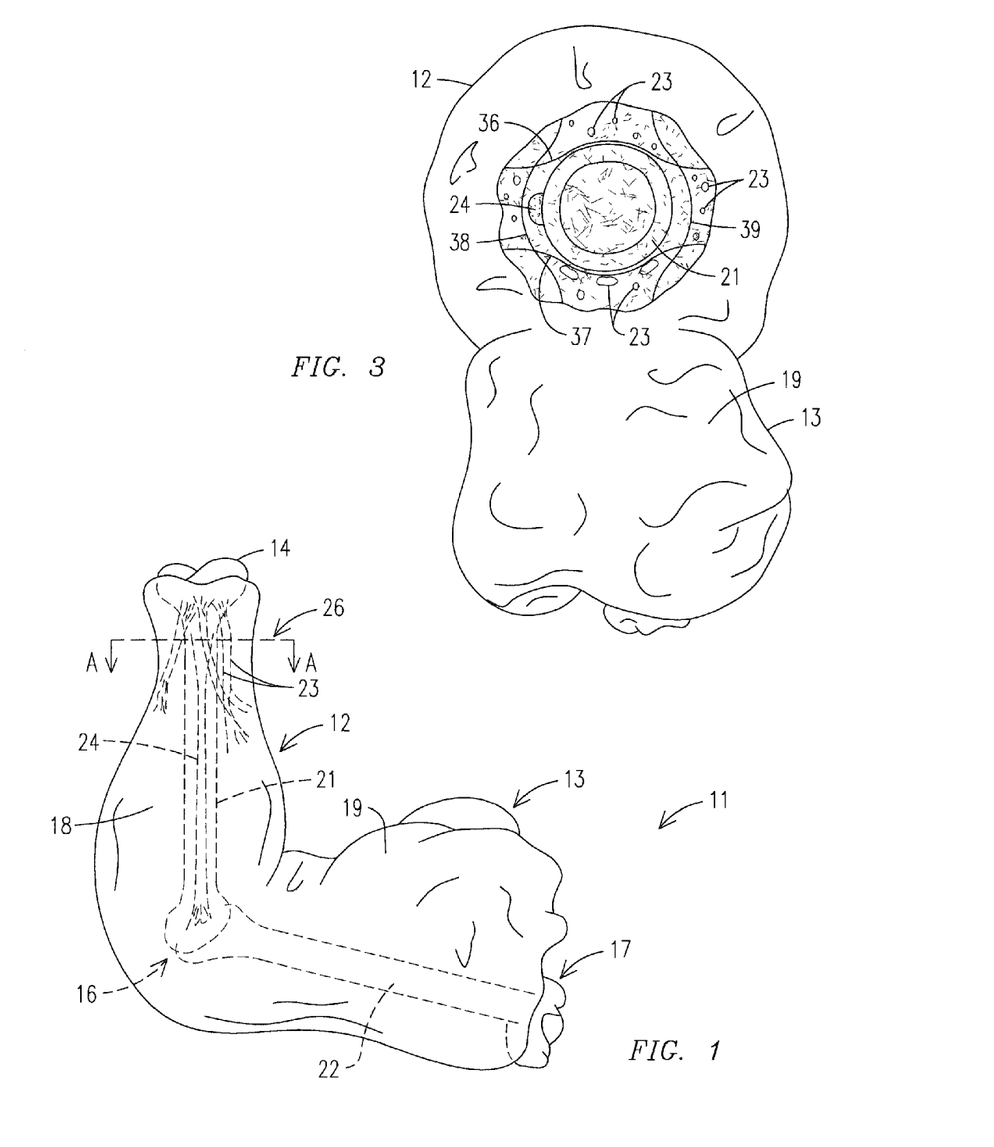
FIG. 1 is a side view of a poultry leg showing internal bones and tendons in phantom lines.
FIG. 3 is an enlarged partially sectioned view of a poultry leg with tendons having been cut according to the process illustrated in FIGS. 2A through 2H

Referring now in more detail to the drawing figures, wherein like reference numerals indicate like parts throughout the several views, FIG. 1 illustrates a poultry leg and in this particular case, the leg of a chicken, from which meat is to be removed in a meat stripping operation. The chicken leg 11 in FIG. 1 is made up of the drumstick 12 bearing drumstick meat 18 and the thigh 13 bearing thigh meat 19. The thigh meat 19 surrounds a thigh bone known as the femur 22 and the drumstick meat 19 surrounds a bone known as the tibia 21. The chicken leg 11 has previously been cut from a chicken carcass in such a way that the femur 22 terminates at its free end in a hip joint 17 and the tibia 21 terminates at its free end in an ankle joint 14. The two bones meet within the chicken leg at the knee joint 16.

Within the drumstick 12 are a plurality of tendons 23 that connect to the tibia 21 near the ankle joint 14 and extend therefrom generally along the length of the drumstick to attach to muscles within the meat of the drumstick. Also contained within the drumstick meat is the small fibula bone 24. The fibula extends along the outside of the tibia; that is, along the side that faces out when a chicken is standing. Thus, the fibula may extend along either the right side or the left side of the tibia depending upon whether the leg is a left or a right leg. The leg illustrated in FIG. 1 is thus a right leg oriented with the thigh facing to the right and the fibula 24 extending along the outside of the tibia 21. A left leg is essentially a mirror image of the right leg and is not shown separately in the drawings.

In preparation for removing the thigh and drumstick meat from the tibia 21 and femur 22, the meat 18 and tendons 23 are cut around the tibia at or about the location of dashed section line 26. Mechanical strippers may subsequently clamp around the tibia at the location of the cut and, while the ankle joint is held in a shackle, the strippers are moved away from the ankle joint thereby stripping the meat from the drumstick 12. The thigh meat 19 may be stripped from the thigh bone in a similar way. As mentioned above, however, while the tendons 23 need to be cut so that the meat can be stripped cleanly from the tibia 21, it is very important that the attaching cartilage of the fibula 24 not be cut at the same time. In this way, the fibula stays attached to the tibia when the meat is stripped away and does not end up in the resulting boneless meat product where it can go undetected and can represent a danger to consumers if eaten.

FIGS. 2A through 2H illustrate sequentially one embodiment of the method of the present invention for cutting tendons in preparation for a meat stripping operation without also cutting the fibula. Each of these figures is a partial cross section of the chicken leg 11 of FIG. 1 taken along section line A-A and looking down from the top. The drumstick 12 is visible with the tibia 21 surrounded by drumstick meat 18. Numerous tendons 23 extend within the drumstick meat 12 generally spaced around the tibia 21 and the fibula 24 extends generally along the outside of the tibia 21. The chicken leg 11 is moved progressively along a processing path in downstream direction 31 by an overhead conveyor, as indicated by the arrows above the frames of the sequence. The steps of the method are carried out as the chicken leg moves along the processing path. FIGS. 2A-2H show the methodology carried out on a right leg wherein the fibula extends on one side of the tibia. It will be understood that for a left leg, the fibula will extend along the opposite side of the tibia, but the methodology is the same for both left and right legs.

Figure 2A:
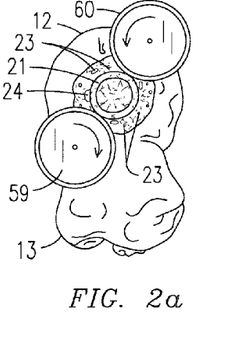
FIGS. 2A through 2H illustrate sequentially the steps of a selective tendon cutting method according to the present disclosure.

In FIG. 2A, the chicken leg 11 is initially oriented as shown with the thigh and second side of the drumstick facing generally toward the outside of the processing path. The first side of the drumstick faces in the opposite direction toward the inside of the processing path. A third side of the drumstick (bearing the fibula 24 in this case) faces generally in the direction of the processing path (i.e. to the left) and a fourth side of the drumstick faces in the opposite or upstream direction. The drumstick 12 initially encounters a first rotary blade 60 on its first side, which makes a first cut 36 (FIG. 2B) to slice the meat and tendons on the first side of the drumstick. Shortly after the first cut 36 is made, the second side of the drumstick encounters a second rotary blade 59 on the outside of the processing path. The second rotary blade 59 makes a second cut 37 (FIG. 2B) to slice the meat and tendons along the second side of the drumstick. For these first two cuts, the tibia 21 may encounter the rotary blades 60 and 59 as the blades cut through the meat and tendons and the blades 60 and 59 may track and ride over the curvature of the tibia 21. In other words, the first two cuts may be made "to the bone" without affecting the fibula 24, which will never extend along the first and second sides of the drumstick.

Figure 2B:
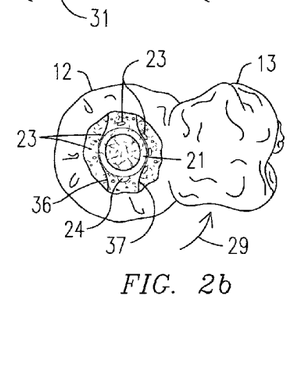
Figure 2C:
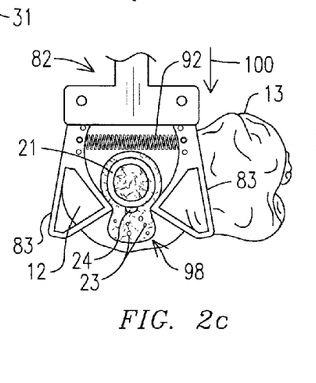

After the first two cuts shown in FIG. 2A, the chicken leg is indexed by 90 degrees as indicated by arrow 29 in FIG. 2B so that the third side of the drumstick and the meat and tendons therein face toward the outside of the processing path. Since the chicken leg shown in FIGS. 2A-2H is a right leg; the fibula 24 extends along the tibia 21 on this third side of the drumstick, as illustrated in FIG. 2B. Accordingly, the next cut to be made must be made in such a way that the tendons 23 on the third side of the drumstick are cut but the fibula 24 is not cut but rather is left intact.

After being indexed as shown in FIG. 2B, the chicken leg continues to advance along the processing path until the drumstick is engaged on its fourth side opposite the third side by an articulating pincher assembly 82, which moves synchronously along the processing path 31. The pincher assembly 82 has jaws 83 that are yieldably spring biased together by a spring 92 and is articulated or otherwise advanced, as detailed below, toward the drumstick in direction 100. When the jaws of the pincher assembly engage the meat of the drumstick, they begin to open as their points slide around the drumstick. In the process, the meat and tendons of the drumstick are pushed around the bone by the points of the jaws until the meat and tendons stretch toward the outside of the processing path to form a bulge 98 (which may be exaggerated somewhat in the drawings for clarity). The meat and tendons are thus stretched out significantly beyond the position of the fibula 24.

Figure 2D:
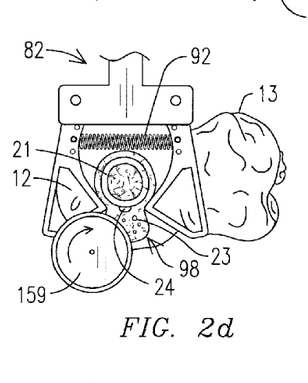
Figure 2E:
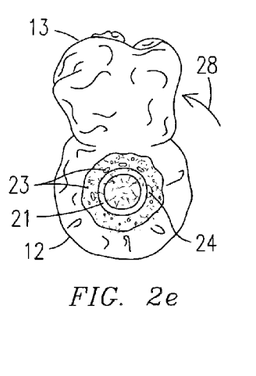

Referring to FIG. 2D, with the meat and tendons held in their bulged configuration, the drumstick encounters a third rotary blade 159 along the outside of the processing path. The rotary blade 159 is positioned to slice through the meat and tendons located within the bulge but not to cut completely to the bone or tibia of the drumstick. In this way, the meat and tendons within the bulge are cut, but the depth of the cut does not extend to the tibia and fibula and does not cut the fibula 24. As a result, the fibula is left intact while the meat and tendons within the bulge are cut.

Figure 2F:
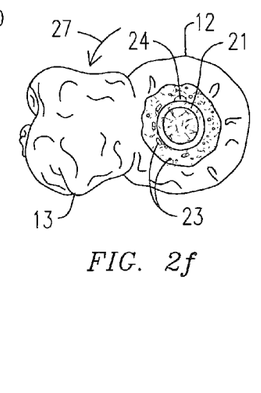
Figure 2G:
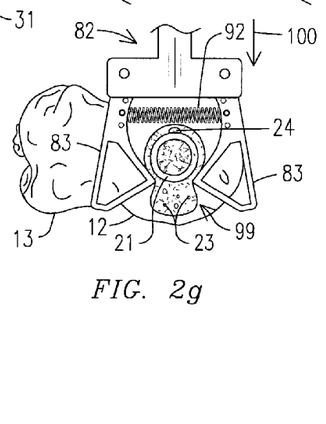
Figure 2H:
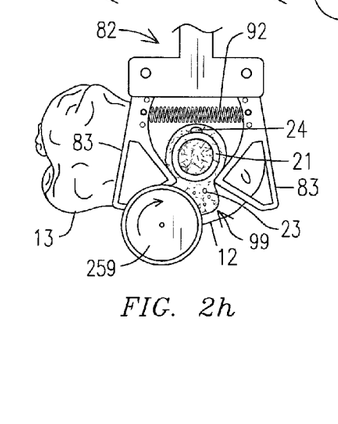

After the third cut is made by the third rotary blade 159, the chicken leg is indexed 180 degrees, which in the illustrated embodiment is accomplished through a first 90 degree indexing 28 (FIG. 2E) followed by a second 90 degree indexing 27 (FIG. 2F) as the chicken leg moves along the processing path. This orients the drumstick with its fourth side facing the outside of the processing path as shown in FIG. 2F. The drumstick is again engaged by the articulating pincher assembly 82, which, as before, pushes and stretches the meat and tendons into a bulge 99 (which again may be exaggerated in the figures for clarity) facing the outside of the processing path. With the meat and tendons held in this bulged configuration, the drumstick encounters a fourth rotary blade 259. As with the third rotary blade 159, the fourth rotary blade 259 slices through the meat and tendons within the bulge but the drumstick is positioned so that the blade does not cut to the tibia bone or the fibula extending therealong. In the illustrated embodiment where a right leg is used for illustration, the fibula 24 is not located on the fourth side of the tibia facing the fourth rotary blade 259. However, when left legs are processed, the fibula 24 will be located on this fourth side and the blade will pass over and not cut the fibula. The process of this invention thus functions equally well for right and left chicken legs.

From the forgoing discussion, it will be seen that four cuts are made on the four sides of the drumstick. The two cuts on sides of the drumstick that do not contain a fibula bone may be made to the bone to insure that the meat and tendons on this side are completely cut. However, the two cuts made on the sides of the drumstick where a fibula may extend are not made to the bone so that a fibula on either of these sides is not cut but rather left intact. This is perhaps best illustrated in FIG. 3, which comprises an enlarged image of the chicken leg 11 after having been processed and cut as described. Here, it is seen that the first cut 36 and the second cut 37 have been made to the bone and have severed the meat and tendons along the opposing first and second sides of the tibia where the fibula is not located. However, the third cut 38 and the fourth cut 39 do not extend to the tibia bone so that the fibula 24, which may be on either of the sides of these cuts, is not severed. Meat can now be stripped from the tibia in a subsequent meat stripping operation and the fibula bone is not stripped away but stays attached to the tibia bone. The fibula thus does not end up in the boneless meat product produced by the stripping operation.

Figure 4:
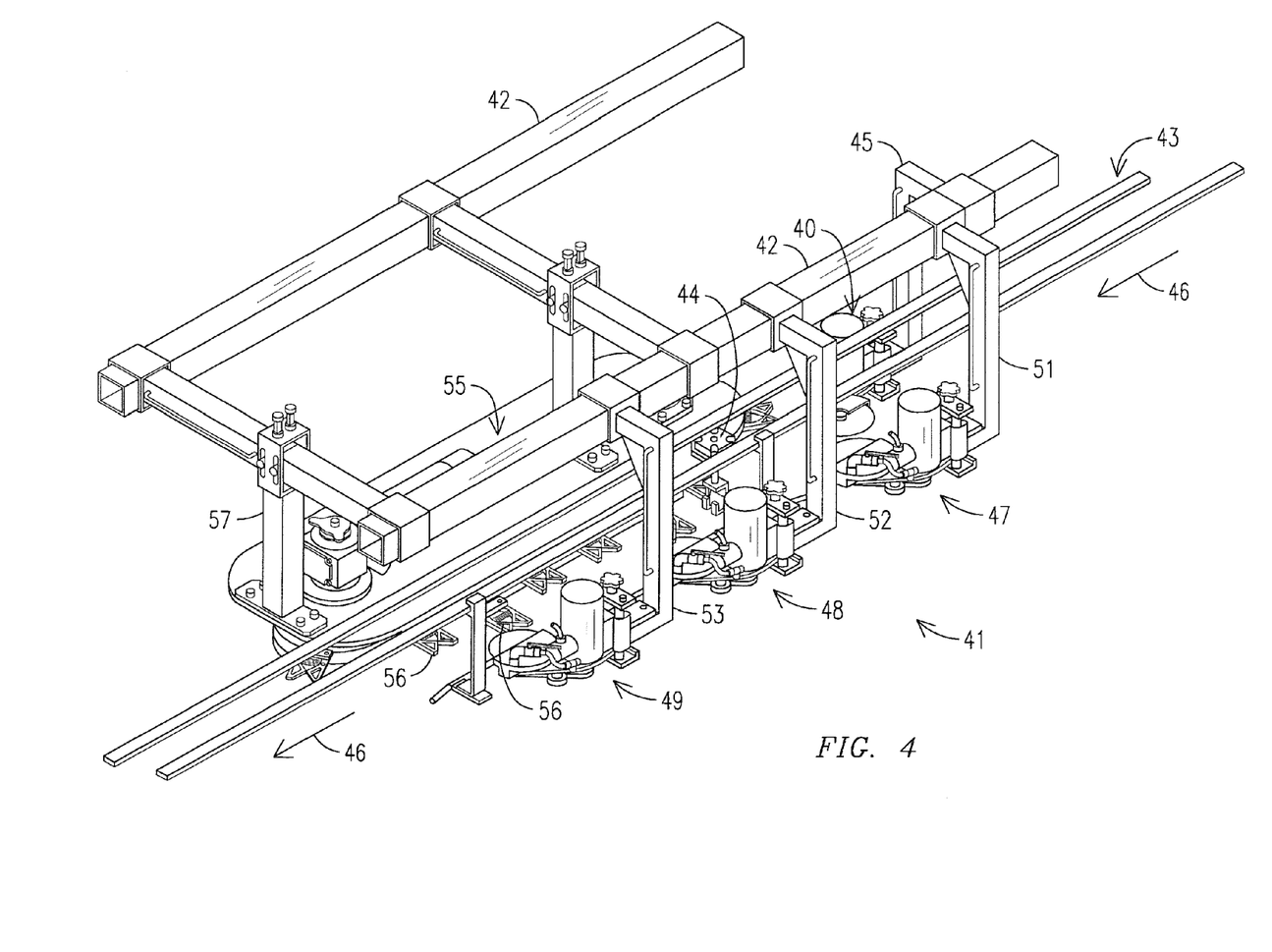
FIG. 4 is a perspective view of one embodiment of an apparatus positionable along a poultry processing line for carrying out the methodology of the invention.

FIG. 4 is an isometric view of one embodiment of an apparatus or pre-cut station 41 for location along a poultry processing line to carry out the method described above. Chicken legs to be processed are suspended by their ankle joints 14 (FIG. 1) from indexable shackle assemblies 44. The shackle assemblies 44 are attached to a chain that, in turn, moves along an overhead conveyor 43 in a processing direction 46. While only one shackle assembly 44 is shown for simplicity in FIG. 4, it will be understood that a plurality of spaced apart shackle assemblies are attached to the conveyor chain so that multitudes of chicken legs can be processed sequentially as they move along the processing path through the apparatus 41.

The apparatus 41 generally comprises a first cutting station 40 supported by a metal support 45 that is attached to a main frame 42 of the processing line. The first cutting station 40 is located on the inside of the processing path or the side facing toward the interior of the machine. A second cutting station 47 is located just downstream of the first cutting station 40 and is supported by a support 51 attached to the main frame 42. The second cutting station is located on the outside of the processing path. A third cutting station 48 downstream of the second cutting station 47 is supported by support 52 and also is located on the outside of the processing path. Finally, a fourth cutting station 49 is located downstream of the third cutting station 48 on the outside of the processing path and supported by support 53. The cutting stations themselves will be described in more detail below.

On the inside of the processing path is an articulating pincher assembly 55 that is suspended from the main frame 42 by supports 57. The articulating pincher assembly 55 comprises a plurality of pinchers 56 that are aligned and move in synchronization with the indexable shackle assemblies 44. Thus, one of the pinchers 56 moves along with a chicken leg suspended from each shackle assembly on the inside of the processing path 46. As detailed below, the pinchers are extendable and retractable toward and away from adjacent chicken legs to engage the legs and stretch meat and tendons into a bulge to be cut at the third and the fourth cutting stations 48 and 49. The operation of the pincher assembly 55 and pinchers 56 will be described in more detail below.

Figure 5:
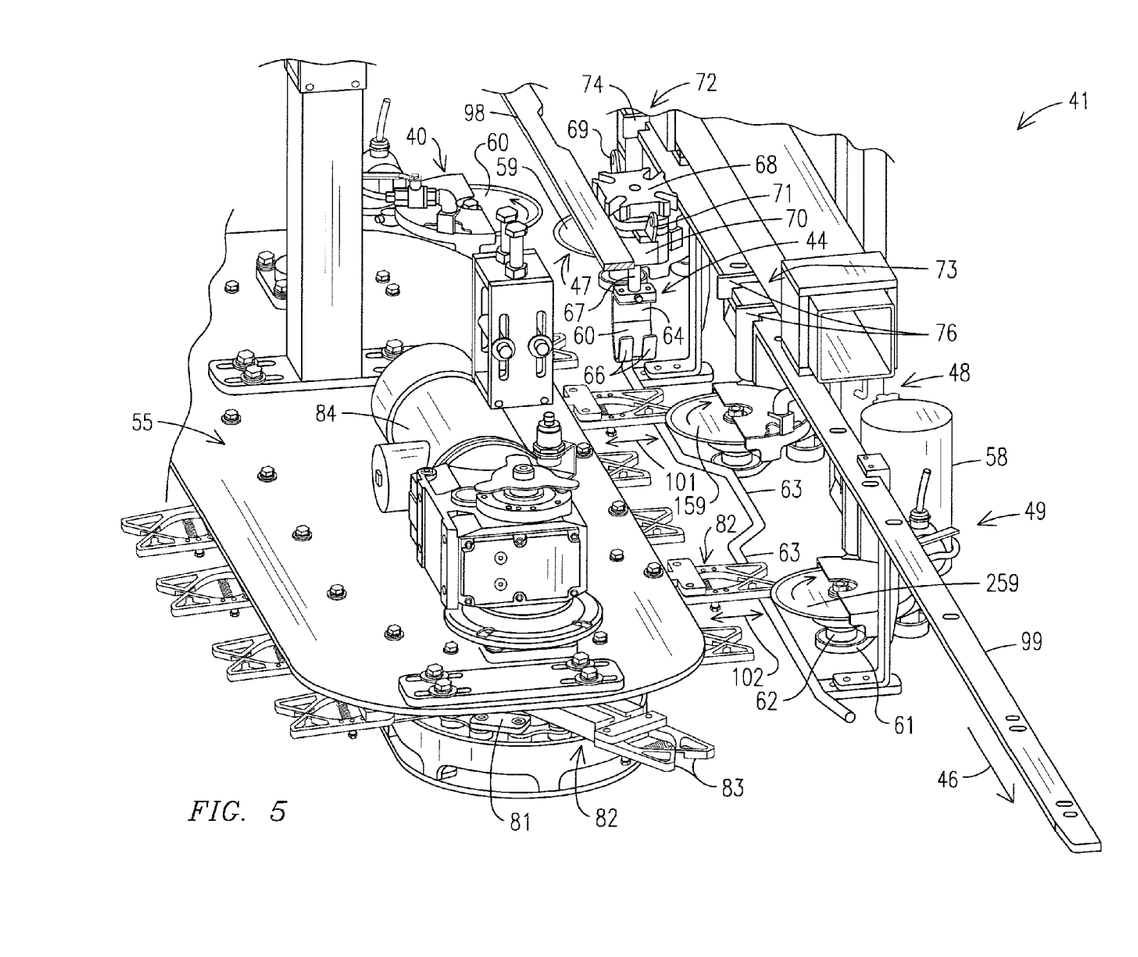
FIG. 5 is a perspective view of the apparatus of FIG. 4 from a different angle illustrating the cutting stations and the articulating pinchers.
Figure 8:
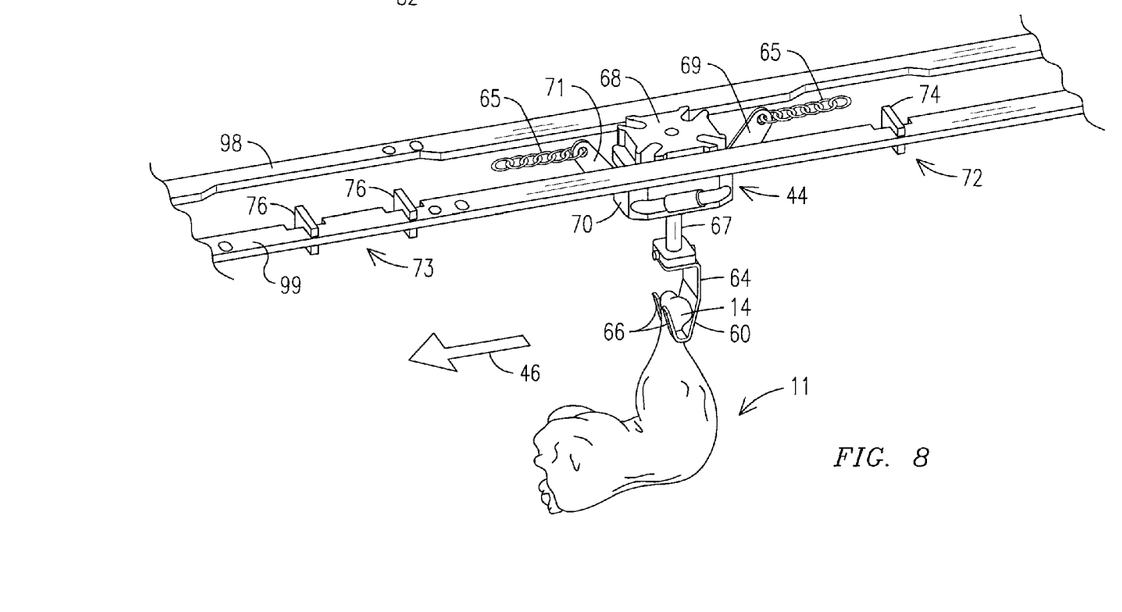
FIG. 8 illustrates an indexable shackle assembly of the apparatus for carrying poultry legs in the processing direction.

FIG. 5 is an isometric view of the processing station 41 looking generally in the upstream direction and with various components of the apparatus removed for clarity. The indexable shackle assembly 44, which for the most part is known in the art, includes a carriage 70 that is suspended by support wings 69 and 71 from a moving overhead chain 65 (FIG. 8). A shaft 67 extends rotatably through the carriage 70 and is fixed at its upper end to an indexing block 68. A shackle 64 is fixed to the bottom end of the shaft 67 and includes a back plate 60 and a pair of spaced apart upstanding front prongs 66. It will thus be seen that when the indexing block is rotatably indexed, the shackle also is indexed. As best shown in FIG. 8, the shackle 64 is configured to receive the ankle bone 14 of a chicken leg 11 and to secure it firmly between the prongs 66 and the back plate 60. In this way, the ankle bone does not rotate or spin in its shackle when the shackle is indexed.

Consequently, the chicken leg itself is indexed more precisely each time the indexing block 68 is indexed.

Referring again to FIG. 5, the shackle assembly is moved in the downstream direction 46 with its indexing block 68 moving between a pair of rails 98 and 99. A first indexing pin 74 projects inwardly from the rail 99 and is located along the processing path between the second cutting station 47 and the third cutting station 48. A pair of indexing pins 76 project inwardly from the rail 99 and this pair of indexing pins are located along the processing path between the third cutting station 48 and the fourth cutting station 49. As the shackle assembly 44 moves along the processing path, a chicken leg that has been hung by a worker from the shackle 64 passes the first and second cutting stations 40 and 47, is indexed 90 degrees counterclockwise by engagement of the indexing block 68 with the first indexing pin 74, passes the third cutting station 48, is indexed 180 degrees counterclockwise by sequential engagement of the indexing block 68 with the two indexing pins 76, and passes the fourth cutting station 49.

Each of the cutting stations is substantially the same and, as shown at the fourth cutting station 49 in FIG. 5, comprises an electric motor 58 that drives a disc-shaped rotary knife blade 259 through a drive train that includes a belt 61 and a pulley 62. The height and position of each of the cutting stations preferably is adjustable to accommodate legs of different sizes. A guide rail 63 extends along the processing path and passes beneath and inside the cutting edges of rotary blades 159 and 259 of the third and fourth cutting stations 48 and 49. The guide rail engages each chicken leg suspended from a shackle 64 to position the drumstick relative to the rotary blades so that the blades will cut to a uniform predetermined depth. A section of the guide rail between the third and fourth cutting stations is displaced away from the processing path so that it will not interfere with the indexed rotation of chicken legs between the third and fourth cutting stations.

A pincher assembly 55 is located inside the processing path and carries an array of articulating pinchers 82. Pinchers 82 are mounted to an endless chain 81 and are moved in a clockwise direction by a motor 84. The flight of the endless chain adjacent the third and fourth cutting stations thus moves in the downstream direction 46. Each pincher 82 is positioned on the chain 81 to align with a corresponding one of the shackle assemblies 44 and the chain is driven in synchronization with the shackle assemblies. In this way, each pincher 82 maintains its alignment with its corresponding shackle assembly as the two move in the processing direction 48 past the third and fourth cutting stations 48 and 49. The pinchers 82 preferably are positioned horizontally to align just beneath with the rotary blades 159 and 259 of the of the third and fourth cutting stations 48 and 49. Each pincher assembly comprises a pair of jaws 83 (FIG. 7) that are yieldably spring biased into engagement such that the sharp rather thin points 99 of the jaws engage one another.

A cam and cam follower mechanism 86 (FIG. 6) within the pincher assembly 55 causes each pincher to extend outwardly toward the rotary blade 159 of the third cutting station 48 as the pincher passes the third cutting station. Each pincher is then retracted to make room for a chicken leg to be rotatably indexed after passing the third cutting station (see arrow 101). Similarly, each pincher is extended again toward the rotary blade 259 of the fourth cutting station 49 as the pincher passes the fourth cutting station and then retracted as generally indicated by arrow 102.

The just described apparatus functions generally as follows to affect the four cuts 36, 37, and 38 and 39 (FIG. 3) as chicken legs are conveyed along the processing path. A worker hangs a chicken leg to be cut from the shackle of a shackle assembly at a location upstream of the apparatus. In some cases, the chicken leg may previously have been cut longitudinally along the drumstick to loosen meat around the tibia, but this is not necessarily a requirement of the process. At this location, the prongs 66 of the shackle are facing toward the outside of the processing path toward the worker. The chicken leg is hung with its thigh meat facing the outside of the processing path toward the worker. Accordingly, the fibula or pin bone will either be on the right side or the left side of the tibia from the worker's perspective depending upon whether the chicken leg is a right leg or a left leg. The suspended chicken leg is conveyed by the shackle assembly first past the rotary blade 60 of the first cutting station 40. The rotary blade 60 is positioned to make the first cut 36 through the meat and tendons of the chicken leg on the side opposite the thigh. As mentioned earlier, this cut can be made to the bone since there is no fibula extending along this side of the tibia.

After the first cut 36 is made, the chicken leg is carried immediately past the second cutting station 47, which likewise cuts the meat and tendons in the drumstick on the second side of the chicken leg to form the second cut 37 (FIG. 3). Again, this second cut can be to the bone since the fibula is not located on this side of the tibia. After the first and second cuts, the turning block 68 of the shackle assembly passes turning pin 74, which indexes the shackle 64 and the suspended chicken leg through 90 degrees in a counter-clockwise direction. The indexed chicken leg then is engaged by the guide bar 63 before passing the rotary blade 159 of the third cutting station 48. The guide bar stabilizes the drumstick and, more importantly, positions it so that the cutting edge of rotary blade 159 will not cut to the tibia bone but instead will only cut to a predetermined depth spaced from the tibia and fibula. In other words, the drumstick is positioned so that the blade 159 will not cut completely to the tibia bone.

Just before encountering the third rotary blade 159, one of the pinchers is articulated to extend outwardly and to engage the drumstick of the chicken leg on the side of the drumstick opposite the blade. As the pincher continues to extend outwardly, its jaws are forced to open progressively as they move around the drumstick and then the jaws begin to close as the points of the jaws move past the tibia of the drumstick. As discussed in detail above, this causes the meat and tendons in the drumstick to be pushed and stretched by the points of the pincher jaws into a bulge of meat containing tendons with the bulge facing the approaching rotary blade 159. As the chicken leg passes the rotary blade 159, the blade slices through the bulge of meat and tendons, but does not cut completely to the bone. As a result, the meat and tendons are cut, but a fibula or pin bone extending along the tibia is not cut.

After passing the third cutting station 48, the indexing block 68 passes the two indexing pins 76 in sequence. This indexes the shackle 64 and the chicken leg suspended therefrom through two 90 degree increments in a counter-clockwise direction for a total rotation of 180 degrees. The chicken leg thus becomes oriented as shown in FIG. 2F with its fourth side facing the outside of the processing path and engages the guide bar 63 in this orientation. As before, the guide bar 63 is located to position the drumstick so that the fourth rotary blade 259 will not cut completely to the tibia bone or the fibula when the fourth cut is made.

Just before encountering the fourth rotary blade 259, one of the pinchers again is articulated to extend outwardly and to engage the drumstick of the chicken leg on the side of the drumstick opposite the blade. As the pincher continues to extend outwardly, its jaws are forced to open progressively as they move around the drumstick and then begin to close as the points of the jaws move past the tibia of the drumstick. Once again, this causes the meat and tendons in the drumstick to be pushed and stretched by the points of the pincher jaws into a bulge of meat containing tendons that faces the approaching rotary blade 259. As the chicken leg passes the rotary blade 259, the blade slices through the bulge of meat and tendons, but does not cut completely to the tibia bone or the fibula because of being positioned by the guide bar 63. As a result, the meat and tendons are cut, but a fibula or pin bone extending along the tibia is not cut. In the example of FIG. 2, there is no fibula on this fourth side of the tibia, but roughly half of the chicken legs will have a fibula on this side because they will be an opposite side leg. After the fourth cut, the pincher 82 is again retracted and moves around to the back flight of its endless chain for the next successive cycle.

Figure 6:
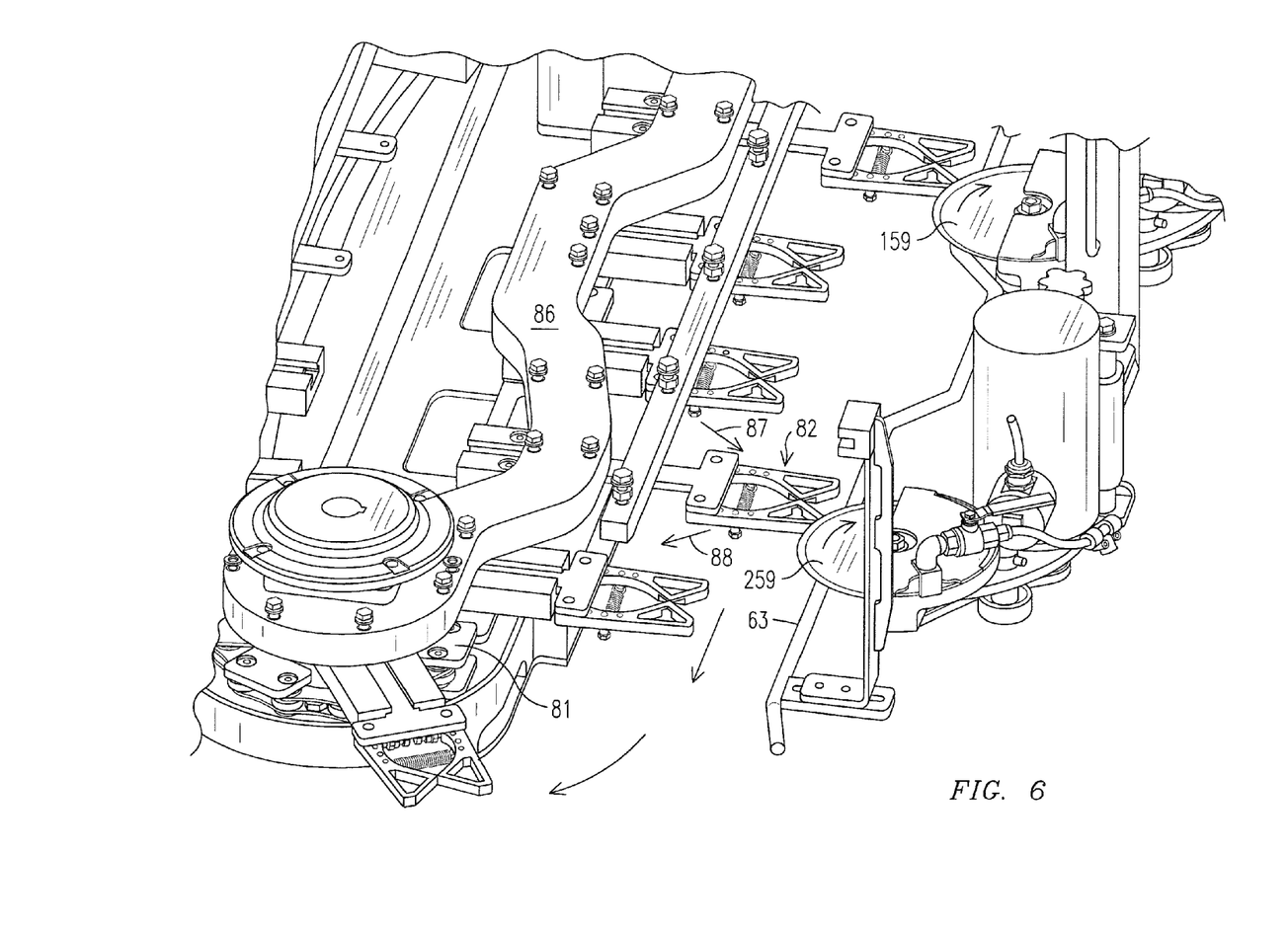
FIG. 6 is an enlarged perspective showing a cutting station of the apparatus of FIG. 4 and illustrating the mechanism for articulating the pinchers of the apparatus.
Figure 7:
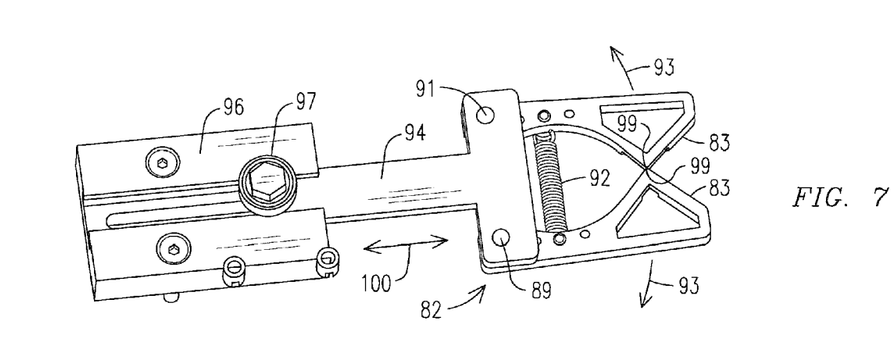
FIG. 7 is a perspective view of one of the pinchers illustrating the cam follower that rides in a corresponding cam track to affect articulation of the pinchers.

FIGS. 6 and 7 illustrate in more detail the pinchers 82 and pincher mechanism. Referring first to FIG. 7, each pincher 82 comprises a carrier block 96 that attaches to the endless chain 81. A generally T-shaped arm 94 is slidably mounted to the carrier block 96 such that it can extend and retract relative to the carrier block in the direction indicated by arrow 100. A cam follower 97 is mounted to the arm 94 such that movement of the cam follower causes extension and retraction of the arm 94. A pair of pincher jaws 83 is pivotally mounted to the arm 94 by means of pivot pins 89 and 91. The jaws 83 are thus able to pivot together and apart as indicated by arrows 93. A spring 92 extends between the jaws 83 and biases the jaws yieldably to their closed position shown in FIG. 7. In this position, the rather sharp thin points 99 of the jaws engage one another but can be moved apart when the jaws pivot against the bias of the spring 92.

Referring to FIG. 6, a plurality of pinchers 82 are each mounted to the endless chain 81 within the pincher assembly. A cam track 86 is mounted within the pincher assembly and is formed with a downwardly facing track (not visible) into which the cam followers 97 of the pinchers 82 extend. The track is shaped to cause each pincher 82 to extend outwardly as indicated by arrow 87 toward the blades 159 and 259 as the pincher moves past the third and fourth cutting stations and then to retract as indicated by arrow 88. In operation, each pincher extends to engage the drumstick of a chicken leg just before the drumstick is cut by the blade of one of the cutting stations. The jaws of the pincher spread against the bias of the spring 92 to accommodate drumsticks of different thicknesses and shapes. In doing so, the points 99 of the jaws push and stretch the meat and tendons of the drumstick into a bulge facing the blade as described above.

FIG. 8 illustrates perhaps more clearly the indexing shackle assembly 44. Indexing shackle assemblies of this general type are known in the art and need not be described in great detail here. The shackle assembly 44 includes a carriage 70 that is attached by wings 71 and 69 to a conveyor chain 65 that is driven in the processing direction 46. As mentioned, a shaft 67 extends through the carriage 70 and is fixed to an indexing block 68 at its top end. A shackle 64 is fixed to the bottom end of the shaft 67 and rotation of the indexing block 68 causes corresponding rotation of the shackle 64. Magnets, detents, or other devices between the indexing block 68 and the carriage 70 may be arranged to hold the indexing block and thus the shackle in any one of several indexed orientations if desired. However, this is not a limitation of the invention since the rails 98 and 88 guide the indexing blocks and retain them in one orientation until they are indexed by the indexing tabs 74 and 76.

The indexing block rides between rails 98 and 99 and indexing tabs 74 and 76 project inwardly at predetermined locations along the rail 99. The indexing block 68 is formed with radial slots at its corners. When the indexing block passes an indexing tab, the tab catches one of the corner slots of the indexing block, which causes the indexing block and the shackle to index 90 degrees to its next indexed orientation. In the present invention, and as detailed above, the indexing block is indexed once through 90 degrees by indexing pin 74 between the second and third cutting stations and is indexed twice through 180 degrees between the third cutting station and the fourth cutting station.

FIG. 8 also illustrates a chicken leg 11 suspended by its ankle joint from the shackle 64. The ankle joint 14 is held firmly between the prongs 66 and the back plate 60 of the shackle, which ensures that the chicken leg does not twist in the shackle during indexing. As shown, the chicken leg is oriented within the shackle with its thigh meat facing generally in the direction of the prongs 66 so that the four cuts 36, 37, 38, and 39 can be made along the appropriate sides of the drumstick as detailed above.

The invention has been described herein in terms of preferred embodiments and methodologies considered by the inventors to represent the best modes of carrying out the invention. It will be understood by the skilled artisan, however, that a wide range of modifications or substitutions might be made in the illustrated embodiments within the scope of the invention. For example, the cuts may be made in a different order and/or the chicken leg indexed in a different direction or both directions if desired. Any of the cuts can be made on either side of the processing path. The method and apparatus detailed herein is well suited to the processing of chicken legs, but may be applied to turkey legs, fowl legs, or indeed to any meat product that requires selective cutting around a bone for the removal of meat from the bone. These and other additions, deletions, substitutions, and modifications may well be made by the skilled artisan without departing from the spirit and scope of the invention as set forth in the claims.

What is claimed is:

1. A method of cutting tendons and meat of a drumstick having a tibia while leaving the fibula of the drumstick uncut, the drumstick having first and second sides where the fibula is not located and third and fourth sides along one of which the fibula extends, the method comprising the steps of:
    (a) suspending the drumstick from its ankle joint;
    (b) moving the suspended drumstick in a downstream processing direction;
    (c) cutting the meat and tendons extending along the first side of the drumstick;
    (d) cutting the meat and tendons extending along the second side of the drumstick;
    (f) pushing and stretching the meat and tendons of the drumstick to form a bulge projecting in the direction of the third side of the drumstick;
    (g) cutting through the meat and tendons within the bulge while insuring that the cut is not made completely to the tibia;
    (h) pushing and stretching the meat and tendons of the drumstick to form a bulge projecting in the direction of the fourth side of the drumstick; and
    (i) cutting through the meat and tendons within the bulge while insuring that the cut is not made completely to the tibia.

2. The method of claim 1 wherein step (a) comprises hanging the drumstick by its ankle joint from a shackle.

3. The method of claim 2 wherein the shackle is configured to prevent rotation of the ankle joint within the shackle.

4. The method of claim 3 wherein step (b) comprises moving the shackle in the downstream direction.

5. The method of claim 4 wherein step (c) comprises cutting the meat and tendons substantially to the tibia.

6. The method of claim 1 wherein step (c) comprises engaging the drumstick with a knife blade.

7. The method of claim 6 wherein the knife blade comprises a rotary knife blade.

8. The method of claim 6 wherein step (d) comprises engaging the drumstick with a knife blade.

9. The method of claim 8 wherein the knife blade comprises a rotary knife blade.

10. The method of claim 6 wherein step (g) comprises engaging the bulge with a knife blade.

11. The method of claim 10 wherein the knife blade comprises a rotary knife blade.

12. The method of claim 6 wherein step (i) comprises engaging the bulge with a knife blade.

13. The method of claim 12 wherein the knife blade comprises a rotary knife blade.

14. The method of claim 1 wherein step (f) comprises engaging the drumstick with a yieldably biased pincher from the fourth side of the drumstick and urging the pincher toward the third side of the drumstick.

15. The method of claim 1 wherein step (h) comprises engaging the drumstick with a yieldably biased pincher from the third side of the drumstick and urging the pincher toward the fourth side of the drumstick.

16. The method of claim 1 further comprising forming a longitudinal cut in the meat of the drumstick or in the meat of the leg prior to pushing and stretching the meat and tendons.

17. A method of cutting meat and tendons surrounding a first bone without cutting a second bone extending along the first bone, the method comprising the steps of:
(a) pushing and stretching the meat and tendons in the direction of the second bone to form a bulge containing meat and tendons; and
(b) cutting through the bulge to a depth spaced from the first bone and the second bone.

18. The method of claim 17 wherein step (a) comprises engaging the meat and tendons with a pincher on a side opposite the second bone and urging the pincher in the direction of the second bone.

19. The method of claim 17 wherein step (b) comprises positioning the first bone so that the first bone is spaced from the path of a blade and moving the blade and the bulge relative to each other so that the knife blade cuts through the bulge.

20. An apparatus for cutting meat and tendons surrounding a first bone of a leg without cutting a second bone that extends along a side of the first bone, the apparatus comprising:
a conveyor for moving the leg along a processing path;
a pincher configured to engage the leg as it moves along the processing path and to urge the meat and tendons of the leg progressively in the direction of the second bone forming a bulge containing meat and tendons;
a blade configured to slice through the bulge containing meat and tendons to a depth spaced from the first bone and the second bone;
whereby meat and tendons within the bulge are cut by the knife without cutting the second bone.

21. The apparatus of claim 20 further comprising a guide configured and located to engage the leg and hold it a position where the first bone and the second bone are spaced beyond the depth of the knife through the bulge.

22. The apparatus of claim 20 wherein the pincher comprises opposed jaws and a biasing member yieldably biasing the jaws together, the jaws moving around the leg as the pincher is advanced to grasp the meat and tendons and push them into a bulge.

23. The apparatus of claim 22 wherein the jaws are configured with opposing points.

* * * * *